(12) United States Patent
Ohashi et al.

(10) Patent No.: US 8,409,016 B2
(45) Date of Patent: Apr. 2, 2013

(54) CARD GAME SYSTEM AND CARD USED IN THE CARD SYSTEM

(75) Inventors: Takahiro Ohashi, Tokyo (JP); Yoshihiko Narita, Tokyo (JP); Takashi Inubushi, Tokyo (JP); Kazuya Takahashi, Tokyo (JP); Naotaka Suzuki, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 689 days.

(21) Appl. No.: 10/596,358

(22) PCT Filed: Nov. 26, 2004

(86) PCT No.: PCT/JP2004/017579
§ 371 (c)(1),
(2), (4) Date: Sep. 14, 2006

(87) PCT Pub. No.: WO2005/056141
PCT Pub. Date: Jun. 23, 2005

(65) Prior Publication Data
US 2007/0082723 A1    Apr. 12, 2007

(30) Foreign Application Priority Data
Dec. 10, 2003 (JP) .................................. 2003-412051

(51) Int. Cl.
*A63F 9/24* (2006.01)
(52) U.S. Cl. .............................. 463/43; 463/29; 463/42
(58) Field of Classification Search .............. 463/30–40, 463/42–43
See application file for complete search history.

(56) References Cited

U.S. PATENT DOCUMENTS

| 4,856,787 | A | * | 8/1989 | Itkis | 273/237 |
| 5,825,876 | A | * | 10/1998 | Peterson, Jr. | 705/52 |
| 6,179,713 | B1 | | 1/2001 | James et al. | |

(Continued)

FOREIGN PATENT DOCUMENTS

| JP | 5-30475 B2 | 5/1993 |
| JP | 06154420 A | 6/1994 |

(Continued)

OTHER PUBLICATIONS

International Search Report for PCT/JP2004/017579 mailed Feb. 15, 2005.

(Continued)

*Primary Examiner* — Peter DungBa Vo
*Assistant Examiner* — Steve Rowland
(74) *Attorney, Agent, or Firm* — Edwards Wildman Palmer LLP; Brian R. Landry

(57) ABSTRACT

A card game system in which a game progresses based on game information recorded in a card in each of a plurality of game apparatuses. The game apparatus set as a master apparatus includes a master reception device that receives the game information transmitted from each of the game apparatuses, a permission device that rejects the reception of game information until a start determination device determines to start a specific time and that permits the reception of game information when the start determination device determines to start the specific time, and a rejection device that rejects the reception when an elapse time determination device determines that the set time as the specific time in advance elapses after permitting the reception. Each game apparatus includes a terminal transmission device that transmits the game information to the master reception device.

7 Claims, 15 Drawing Sheets

U.S. PATENT DOCUMENTS

| | | |
|---|---|---|
| 6,203,433 B1 | 3/2001 | Kume et al. |
| 6,346,048 B1 | 2/2002 | Ogawa et al. |
| 6,645,075 B1 * | 11/2003 | Gatto et al. ............ 463/25 |
| 6,852,031 B1 * | 2/2005 | Rowe ..................... 463/29 |
| 2002/0020745 A1 * | 2/2002 | Yap et al. ................ 235/451 |
| 2002/0028710 A1 * | 3/2002 | Ishihara et al. ......... 463/44 |
| 2003/0139214 A1 * | 7/2003 | Wolf et al. ............. 463/42 |
| 2005/0043089 A1 * | 2/2005 | Nguyen et al. ......... 463/29 |
| 2005/0192089 A1 * | 9/2005 | Blatter et al. .......... 463/29 |

FOREIGN PATENT DOCUMENTS

| | | |
|---|---|---|
| JP | 7-185133 A | 7/1995 |
| JP | 2002-224443 A | 8/2002 |
| JP | 2002-239207 A | 8/2002 |
| JP | 2003-236032 | 8/2003 |

OTHER PUBLICATIONS

Patent Abstracts of Japan for JP7-185133 published on Jul. 25, 2995.
Patent Abstracts of Japan for JP2002-239207 published on Aug. 27, 2002.
Patent Abstracts of Japan for JP2002-224443 published on Aug. 13, 2002.
Patent Abstracts of Japan for JP5-30475 published on May 10, 1993.

* cited by examiner

FIG. 6A

| 20 | WRESTLER ID | A0001 |
|---|---|---|
| PER | POWER | 16 |
| SPR | SPEED | 10 |
| TER | TECHNIQUE | 10 |
| TH | TOUGHNESS | 10 |
| WG | WEIGHT | 100 |
| HP | LIFE POINT SCORE | 100 |

FIG. 6B

| 30 | TECHNIQUE ID | B0001 |
|---|---|---|
| PEW | POWER | 10 |
| SPW | SPEED | 20 |
| TEW | TECHNIQUE | 10 |
| MD | MAX DEGREE OF DAMAGE | 100 |

FIG. 8A

| | |
|---|---|
| PLAYER ID | XYZ01 |
| WRESTLER ID | A0001 |
| POWER | 16 |
| SPEED | 10 |
| TECHNIQUE | 10 |
| TOUGHNESS | 10 |
| WEIGHT | 100 |
| LIFE POINT SCORE | 100 |

21, PER, SPR, TER, TH, WG, HP

FIG. 8B

| | |
|---|---|
| PLAYER ID | XYZ01 |
| TECHNIQUE ID | B0001 |
| POWER | 10 |
| SPEED | 20 |
| TECHNIQUE | 10 |
| MAX DEGREE OF DAMAGE | 100 |

31, PEW, SPW, TEW, MD

CARD GAME SYSTEM AND CARD USED IN THE CARD SYSTEM

CROSS-REFERENCE TO PRIOR APPLICATION

This is a U.S. National Phase Application under 35 U.S.C. §371 of International Patent Application No. PCT/JP2004/017579 filed Nov. 26, 2004, and claims the benefit of Japanese Patent application No. 2003-412051 filed Dec. 10, 2003, both of which are incorporated by reference herein. The International application was published in Japanese on Jun. 23, 2005 as WO 2005/056141 A1 under PCT Article 21(2).

TECHNICAL FIELD

The present invention relates to a card game system and a card used in the card game system.

BACKGROUND ART

A card game system in that a game proceeds based on game information recorded in a plurality of cards are already disclosed. In each of these ordinary card game systems, a specific time is set in the game for reading the game information recorded in the cards, a player is allowed to select a desired card from among the cards within the specific time, and the game information recorded in the card is read to a game machine (see, for example, Patent Literature 1). In addition, many types of game systems in each of which a plurality of game machines connected to each other so as to be able to transmit and receive data to and from each other play allowing to a battle game are already disclosed.

Patent Literature 1: Japan Examined Patent Publication (Kokoku) No. 5-30475

DISCLOSURE OF THE INVENTION

Problems to be Solved by the Invention

However, the conventional card game systems have the following problems. The specific time is counted in every game machine. However, when a game is played with a plurality of game machines connected to each other so as to be able to transmit and receive data to and from, there is a high probability of danger that some deviance occurs between the specific time allowed to each player since the specific time is counted in every game machine. As a result, particularly in the game, for which synchronization of players' operations is important, interest of the game may possibly be diminished. In addition, if the game information is recorded in each card by a recording method such as a barcode recording method which has a directivity in reading the information, each player needs to pay attention to a reading direction of the card whenever the player makes the corresponding game machine read a card. Especially if the number of cards owned by each player increase and time for selecting the card is limited, the time for paying attention to the direction of the card makes a player feel annoying, and this diminishes a sense of speed and an interest factor in the course of the game. On the other hand, if a method for replacing the game information by buttons on each game machine is used, the number of types of game information available in a game is limited to the number of buttons.

It is, therefore, an object of the present invention to provide a card game system that performs synchronization, and a card used in the card system.

Means to Solve the Problems

A card game system according to the present invention is a card game system in which a plurality of game machines, each of which can function as either a master machine that controls a game or a terminal machine that performs a processes in accordance with indications from the master machine, are connected to each other so as to be able to transmit and receive data to and from each other, and in which if one of the plurality of game machines is set as the master machine, the game machines other than the game machine set as the master machine are set as the terminal machines, and each of the plurality of game machines reads game information recorded in a card within a specific time during the game, then the game progresses based on the read game information, wherein the game machine set as the master machine has: a master reception device for receiving the game information transmitted from each of the plurality of game machines; a start determination device for determining whether to start the specific time; a permission device for rejecting to receive the game information at the master reception device until the start determination device determines to start the specific time, and for permitting the reception when the start determination device determines to start the specific time; an elapse time determination device for determining whether a time set as the specific time in advance elapses after the permission device permits the reception of the game information; and a rejection device for rejecting the reception again when the elapse time determination device determines that the set time elapses, and each of the plurality of game machines has a terminal transmission device for transmitting the game information having been read to the master reception device. By so configuring, the problems described above are solved.

According to the present invention, the game machine set as the master machine rejects the reception of the game information at the master reception device until the reception is permitted, and permits the reception if it is determined that the specific time starts. When it is determined that the specific time elapses, the master machine becomes a state of rejecting the reception again. Accordingly, by permission and rejection of the reception at the master reception device of the game machine set as the master machine, the specific time for permitting the card to be read during the game can be synchronized within the card game system.

The rejection device may reject the reception of the game information further transmitted from the game machine that is a sender of the game information already received by the master reception device even before the elapse time determination device determines that the set time elapses. By doing so, only cards designated within the specific time are received at the master reception unit. Therefore, the number of opportunities of designating a card given within the specific time is only one, whereby the sense of tension in the game can be made high. The rejection of reception for each game machine can be realized by preparing the master reception device for each game machine. In addition, the card game system according to the present invention may be realized in which the number of the plurality of game machines is two.

Further, a card used in the card game system according to the present invention may have three or more sides, and the game information may be printed on a same face along the respective sides. By doing so, the game information is printed on each side on the same face of the card. Therefore, the player can make a client machine read the game information even having a directivity in reading the information without paying attention to the direction of the card. Consequently a sense of speed in the course of the game is not diminished.

Moreover, the problems described above are solved by a master machine of the present invention, the master machine serves as a predetermined reception destination in a card game system in which if each of a plurality of game machines, connected to each other so as to be able to transmit and receive data to and from each other, reads game information recorded in a card and transmits the game information to the predetermined reception destination within a specific time during a game, and the game is controlled based on the game information received at the predetermined reception destination, and the master machine has: a reception device for receiving the game information transmitted from each of the plurality of game machines; a start determination device for determining whether to start the specific time; a permission device for rejecting reception of the game information at the master reception device until the start determination device determines to start the specific time, and for permitting the reception of the game information when the start determination device determines to start the specific time; an elapse time determination device for determining whether a time set as the specific time in advance elapses after the permission device permits the reception of the game information; and a rejection device for rejecting the reception again when the elapse time determination device determines that the set time elapses. For the same reasons as those stated above, this master machine enables the specific time for permitting the card to be read in each game system to be synchronized within the card system.

Effects of the Invention

As described above, according to the present invention, the game machine set as the master machine rejects and permits reception of the game information, whereby the card game system that performs synchronization during a game and the card used in the card game system can be provided.

BRIEF DESCRIPTION OF THE DRAWINGS

FIG. 6A shows wrestler information of each wrestler.

FIG. 6B shows technique information of each technique.

FIG. 8A shows wrestler information associated with a player ID.

FIG. 8B shows technique information associated with a player ID.

BEST MODE FOR CARRYING OUT THE INVENTION

Figure 1:
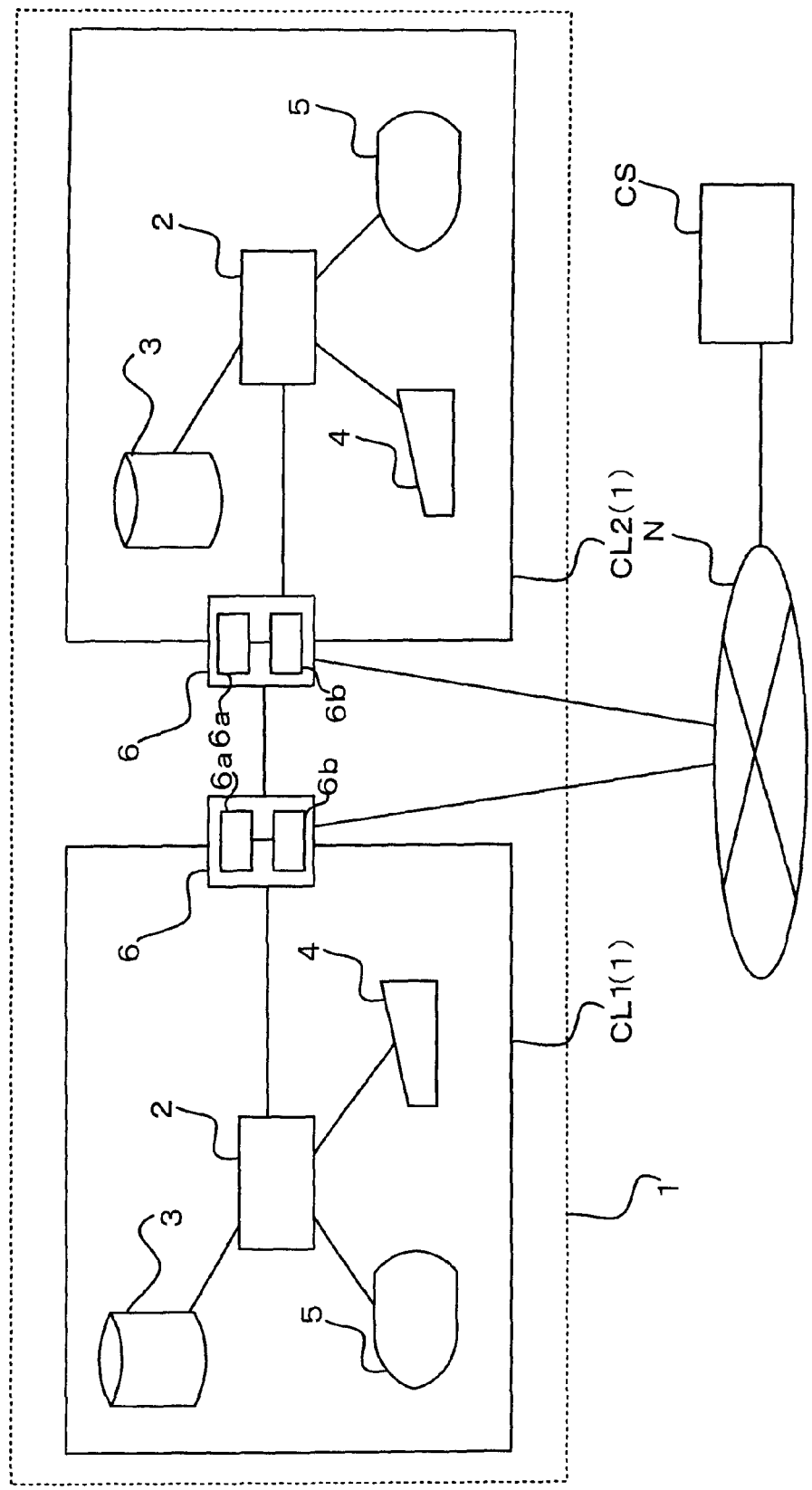
FIG. 1 is a schematic diagram of an exemplary configuration of a card game system according to the present invention.

In an embodiment of the present invention, a card game system that realizes a professional wrestling game as a battle game will be described. The professional wrestling game described in this embodiment will be referred to as "the present professional wrestling game" hereinafter. FIG. 1 is a schematic diagram of an exemplary overall configuration of a card game system 1 according to this embodiment. In the card game system 1, two game machines CL1 and CL2, each having the same configuration are connected to each other so as to be able to transmit and receive data to and from each other by a conventional method. If an installation location of each of the game machines CL1 and CL2 is, for example, an amusement center, the game machines CL1 and CL2 may be installed in either different amusement centers or the same amusement center. When the game machines CL1 and CL2 are not discriminated from each other, they will be referred to simply "the game machine CL" hereinafter.

The game machine CL has a control unit 2 that controls the present professional wrestling game, a storage unit 3 that stores various pieces of data such as a program of the present professional wrestling game, an input unit 4 that receives data recorded in a card as well as player's operations, an output unit 5 that outputs a message or a status of a game to a screen, and a transmission-reception unit 6 that transmits and receives data. The transmission-reception unit 6 has a master transmission-reception unit 6a and a terminal transmission-reception unit 6b. These two transmission-reception units 6a and 6b will be described later. The game machines CL1 and CL2 mediates each other by a conventional method to determine which serves as a master machine and which serves as a terminal machine. The control unit 2 of the game machine CL that serves as the master machine controls a game according to the program of the present professional wrestling game. In addition, the control unit 2 particularly functions as a start determination device for determining whether a specific time starts, a permission device for permitting the master transmission-reception unit 6a to receive specific data when the specific time starts, an elapse time determination device for counting time set as a specific time, and a rejection device for switching the master transmission-reception unit 6a to a mode to reject reception of the specific data when the specific time elapses. The control unit 2 of the game machine CL that serves as the terminal machine only controls the above units of the game machine CL in accordance with an indication from the game machine CL serving as the master machine. Namely, the relationship between the master machine and the terminal machine is a so-called master-slave relationship.

The master transmission-reception unit 6a operates only in the game machine CL that serves as the master machine, and is used to transmit and receive data to and from the other game machine CL. The terminal transmission-reception unit 6b is used to transmit and receive data to and from the game machine CL that serves as the master machine. The master transmission-reception unit 6a is also connected to the terminal transmission-reception unit 6b of its own game machine CL so as to be able to transmit and receive data to and from the unit 6b. Accordingly, in the game machine CL that serves as the master machine, both the master transmission-reception unit 6a and the terminal transmission-reception unit 6b operate. the master transmission-reception unit 6a transmits and receives data to and from a plurality of terminal transmission-reception units 6b . . . 6b including that of its own game machine CL. The master transmission-reception unit 6a is configured to be able to discriminate each of the terminal transmission-reception units 6b.

Therefore, during a battle game, each game machine CL requests its player to operate the game machine CL, and transmits information about the operation from the terminal transmission-reception unit 6b to the master transmission-reception 6a in accordance with an indication from the game machine CL that serves as the master machine. The game machine CL that serves as the master machine controls the present professional wrestling game based on the information about the player's operation received by the master transmission-reception 6a according to the program of the present professional wrestling game. The game machine CL is also connected to a center server CS via a public line N so as to be able to transmit and receive data to and from the center server CS. The transmission-reception unit 6 has a transmission-reception function for the center server CS as well as the master transmission-reception unit 6a and the terminal transmission-reception unit 6b. The center server CS mainly functions as a database. Further, the game machine CL includes a card insertion unit and a card discharge unit as well as the above units shown in FIG. 1.

Figure 2:
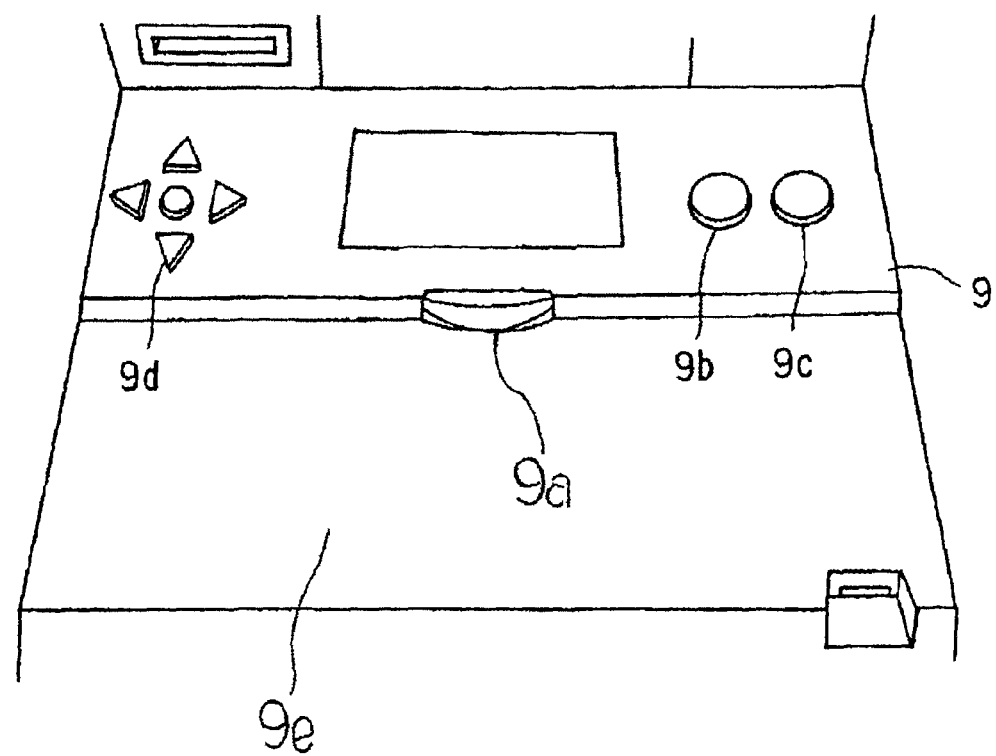
FIG. 2 is an enlarged view of an input unit of a terminal machine.

As shown in FIG. 2, the input unit 4 of the game machine CL is constituted as an operation panel 9. A card slash unit 9a that reads the information stored in a card by slashing the card, and various operation buttons 9b to 9d to which significance is attached for game playing and operable by a player are provided on the operation panel 9. "Slashing the card" means that a putting the surface of the card on a table 9e, and sliding the card from right to left or right to left to pass the card through the card slash unit 9a. The player slashes the card with the surface of the card on which the information recorded in the card is printed turned downward, whereby the information recorded in the card can be read by the card slash unit 9a and recognized by the game machine CL.

In this embodiment, the information recorded in the card is printed in the form of a barcode as will be described later, and the barcode is printed with an invisible ink (so-called stealth ink) having a high transmittance relative to a visible light. Due to this, the card slash unit 9a includes a barcode reader that can read the stealth ink. Namely, if the stealth ink absorbs or reflects an infrared light, a combination of an infrared emitting element and an infrared receiving element is used for the barcode reader. If the stealth ink absorbs or reflects an ultraviolet (UV) light, a combination of a UV emitting element and a UV receiving element is used for the barcode reader. If the stealth ink has a fluorescence relative to a light at a specific wavelength, a combination of a specific-wavelength light emitting element and a specific-wavelength light receiving element is used for the barcode reader. In this embodiment, the stealth ink that absorbs an infrared light is used in the barcode, and a combination of the infrared emitting element and the infrared receiving element is used for the barcode reader. In addition, the various operation buttons 9a . . . 9d include a fall button 9b for designating a fall during a game, a reverse button 9c for designating a counterattack against an opponent's attack, a defensive button 9d for designating a defensive state, and the like. A fall and the defensive state will be described later.

Figure 3:
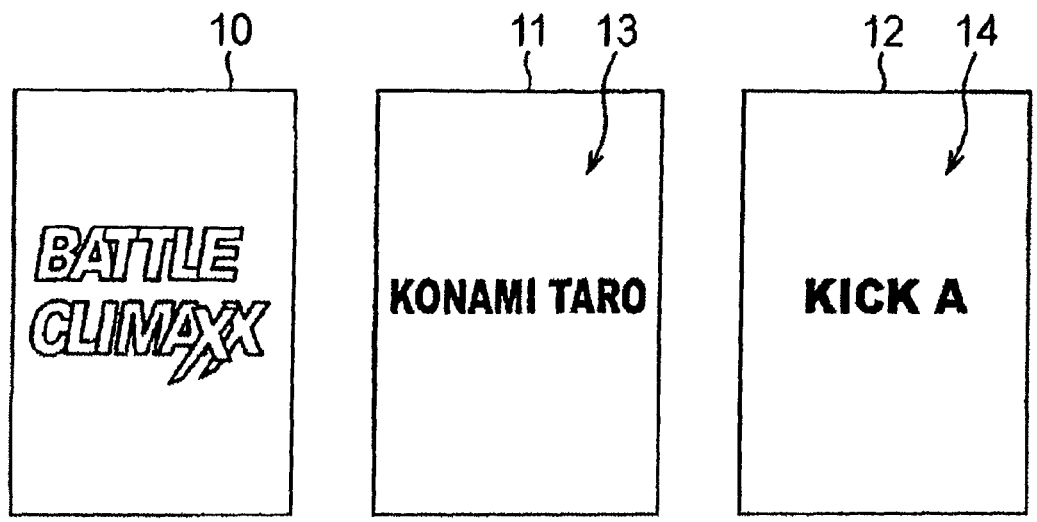
FIG. 3 shows types of cards used in this embodiment.

As shown in FIG. 3, the number of types of cards used in the present professional wrestling game is three, i.e., an entry card 10, a wrestler card 11, and a technique card 12. The entry card 10 is a card that is made to correspond to one player. A player ID as player identification information for identifying the corresponding player from the other players is stored in the entry card 10.

The wrestler card 11 is a card corresponding to a wrestler as a character in the present professional wrestling game. Accordingly, as many types of wrestler cards 11 as wrestlers 13 in the present professional wrestling cards are prepared. The number of types of wrestler cards 11 is prepared equally to the number of wrestlers 13. Alternatively, plural cards can be prepared for different characters (a heel, a baby face, a masked wrestler, an unmasked wrestler, and the like) of one wrestler, or for degrees of growth or the like of one wrestler. A wrestler ID as character identification information for identifying the wrestler corresponding to the wrestler card 11 from the other wrestlers is stored in the wrestler card 11. In the example shown in FIG. 3, a wrestler "KONAMI TARO" corresponds to the wrestler card 11, and the wrestler ID identifying the wrestler "KONAMI TARO" is stored in the wrestler card 11.

Figure 4A:
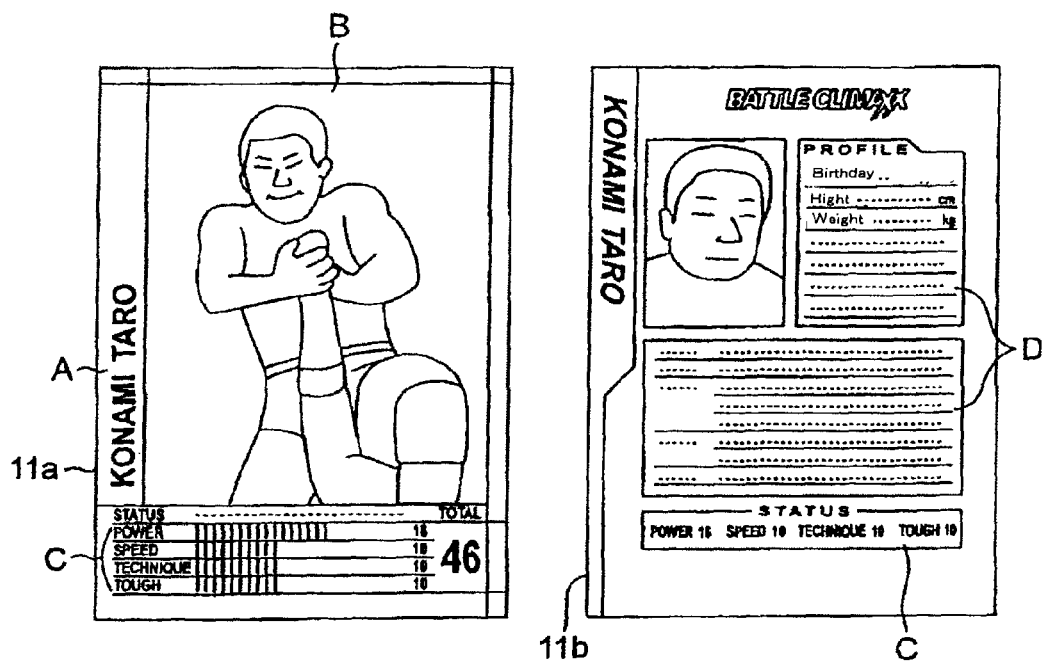
FIG. 4A shows a front face and a back face of a wrestler card.

FIG. 4A shows a front face 11a and a back face 11b of the wrestler card 11. On the front face 11a of the wrestler card 11, a wrestler name A of the wrestler 13, a symbolic photograph B of the wrestler 13, and a "STATUS" space C showing parameters related to abilities of the wrestler 13 are printed. The parameters related to abilities of the wrestler 13 are parameters that indicate battle-related basic abilities including offensive abilities of the wrestler 13. The types of the parameters related to abilities will be described later. On the back face 11b of the wrestler card 11, a "PROFILE" space D is printed. In the "PROFILE" space D, personal information of the wrestler 13 such as a weight, favorite techniques, and past records is shown. In addition, a "STATUS" space C is printed thereon in a mode different from that printed on the front face 11a.

The technique card 12 is a card that is corresponded to a technique 14 which the wrestler 13 can use as an attack content in the present professional wrestling game. Accordingly, as many types of technique cards 12 as techniques which the wrestler 13 can use in the present professional wrestling game are prepared. A technique ID as attack content identification information for identifying the technique 14 corresponding to the technique card 12 from the other techniques 14 is stored in the technique card 12. In the example shown in FIG. 3, the technique 14 made to correspond to the technique car 12 is "KICK A", and the technique ID indicating "KICK A" is stored in the technique card 12.

Figure 4B:
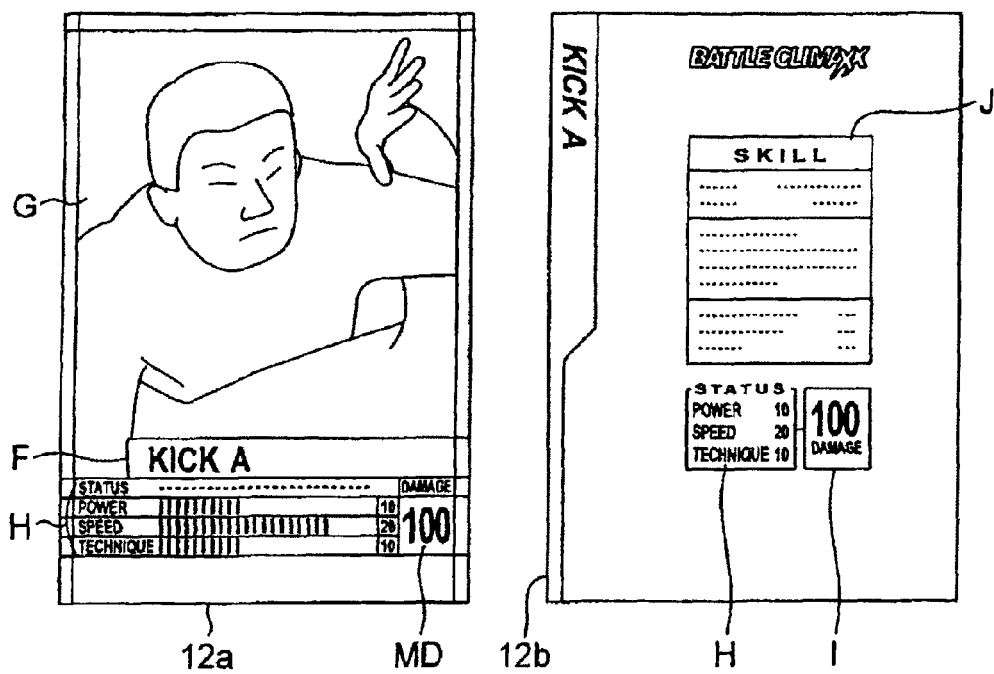
FIG. 4B shows a front face and a back face of a technique card.

FIG. 4B shows a front face 12a and a back face 12b of the technique card 12. On the front face 12a of the technique card 12, a name F of the technique 14, a symbolic photograph G of the technique 14, a "STATUS" space H showing parameters related to difficulty of the technique 14, and a "DAMMAGE" space I showing a degree of damage which is a magnitude of an influence of the technique 14 on an opponent are printed. A value shown in the "DAMAGE" space I is a maximum degree of damage MD that is a maximum value of the degree of damage which can be given to the opponent by the technique 14. Based on the relationship between the difficulty-related parameters shown in the "STATUS" space H and the battle-ability-related parameters shown in the "STATUS" spaces C, H of the wrestler card 11, the degree of damage which the wrestler 13 can perform, which will be described later. Types of difficulty-related parameters shown in the "STATUS" space H will be also described later. On the back face 12*b* of the technique card 12, on the background of a symbolic photograph of the technique 14, a "TECHNIQUE" space J in which description of the technique 14 is printed, and each of a "STATUS" space H and a "DAMAGE" space I is printed in a mode different from a mode in the front face 12*a*.

As stated above, visible information is printed on each of the back faces 11*b* and 12*b* of the wrestler card 11 and the technique card 12, respectively. Also, barcodes 15 . . . 15 shown in FIG. 15 are printed by stealth ink. As stated, for stealth ink, ink absorbing the infrared light is used. The information to be stored in the card 11 or 12 is recorded in the barcodes 15. Thereby, despite being normally unconscious of the barcodes, the player enables the game machine CL to recognize the information recorded in the barcodes printed on the back faces 11*b* and 12*b*, i.e., the wrestler ID and the technique ID by slashing the wrestler card 11 and the technique card 12 with the back faces 11*b* and 12*b* turned downward, respectively.

In the present professional wrestling game, if the wrestler card 11 corresponding to a specific wrestler 13 is slashed at the time of designating the specific wrestler 13, then the wrestler ID recorded in the wrestler card 11 is read by the game machine CL, and the game machine CL recognizes this wrestler ID as that of the designated wrestler 13. The same thing is true for the technique card 12. If the technique card 12 on which a specific technique 14 is recorded is slashed at the time of designating the specific technique 14, then the technique ID is read by the game machine CL, and the game machine CL recognizes that the technique 14 is designated from the read technique ID.

Figure 5:
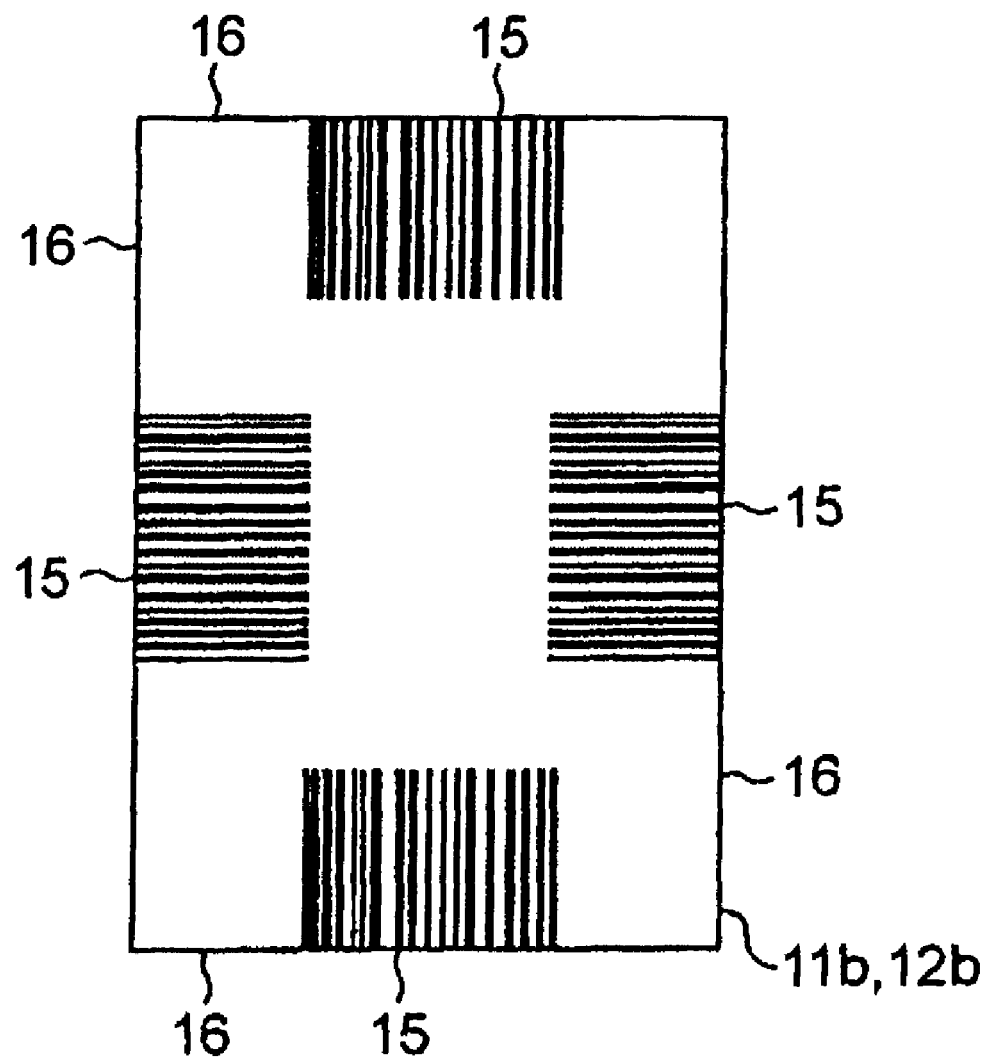
FIG. 5 shows barcodes printed on the back face of each of the wrestler card and the technique card.

By using the stealth ink for printing the barcodes 15, a degree of freedom for layout positions of the information and photographs to be printed on each card can be improved without marring an appearance of the card. Further, according to this embodiment, the barcodes 15 having the same information stored are printed on edges of four respective corners 16 . . . 16 of the card 11, 12 as shown in FIG. 5. Therefore, the player can slash the card without paying attention to the direction of the card. It is thereby possible for the player to use as long time as possible for selection of the card if the time from the selection of card to the slash of card is limited.

FIGS. 6A and 6B show data stored in the center server CS as data common to players. FIG. 6A shows information about the wrestler 13 common to players, which information will be referred to as "wrestler information 20" hereinafter. The wrestler information 20 is prepared for every wrestler 13, and parameters related to abilities of battle, the weight WG, and a life point score HP are stored with the wrestler ID as the wrestler information 20. Pieces of information included in the wrestler information 20 (which are a power PER, a speed SPR, a technique TER, a toughness TH, the weight WG, and the life point score HP in this embodiment) are common to all wrestlers 13. Each wrestler 13 has the different content of each piece of information from the other. The wrestler information 20 shown in FIG. 6A relates to the wrestler "KONAMI TARO", and contents of the power PER, the speed SPR, the technique PER, the toughness TH, the weight WG, and the life point score HP are 16, 10, 10, 10, 100, and 100, respectively.

The parameters related to abilities of wrestler 13 include the power PER, the speed SPR, the technique TER, and the toughness TH. The power PER, the speed SPR, and the technique TER are parameters related to offensive abilities that function as character information. The toughness TH is a parameter that indicates a degree of patience against an attack from the opponent. The life point score HP indicates points lost by a damage given by the opponent during a match. The respective values of the wrestler information 20 are variable by playing the present professional wrestling game as described later.

FIG. 6B shows information about the technique 14 common to players, which information will be referred to as "the technique information 30" hereinafter. The technique information 30 is prepared for every technique 14, and the difficulty-related parameters and the maximum degree of damage MD as well are stored with the technique ID as the technique information 30. The technique information 30 shown in FIG. 6B is related to the "KICK A". The difficulty-related parameters include a power PEW, a speed SPW, and a technique TEW. These parameters correspond to the parameters related to the offensive ability of the wrestler 13, i.e., the power PER, the speed SPR, and the technique TER, respectively. The wrestler 13 having the offensive abilities required by the parameters PEW, SPW, and TEW related to the difficulty of the technique 14 can perform the maximum degree of damage MD. Accordingly, values of the parameters PEW, SWP, and TEW related to the difficulty of the technique 14 indicate the offensive abilities required for the wrestler 13 so as to perform the maximum degree of damage MD. The values of the parameters PEW, SPW, and TEW related to the difficulty of the technique and the maximum degree of damage MD included in the technique information 30 are invariable values that are not updated by a game.

The wrestler information 20 and the technique information 30 are configured to be able to identify a correspondence relation between the parameters of the wrestler 13, i.e., the power PER, the speed SPR, and the technique TER and those of the technique 14, i.e., the power PEW, the speed SPW, and the technique TEW. The parameters stored in the center server CS as the wrestler information 20 and the technique information 30 are equal in value to those printed on the wrestler card 11 and the technique card 12.

As stated above, to perform the maximum degree of damage MD by the technique 14, the wrestler 13 should have the offensive abilities required by the technique 14. In the present professional wrestling game, the degree of damage which the wrestler 13 can perform by the technique 14 is determined according to a degree of learning of the wrestler 13 in relation to the technique 14. If the degree of learning is equal to 100 percent, the wrestler 13 can perform the maximum degree of damage. If the degree of learning is, for example, 80 percent, the wrestler 13 can perform only 80 percent of the maximum degree of damage MD. This degree of learning is attack control information and will be referred to as "experiential value" hereinafter. A method for calculating the experiential value will be described later. The wrestler 13 can increase the experiential value by taking training to be described later.

Figure 7:
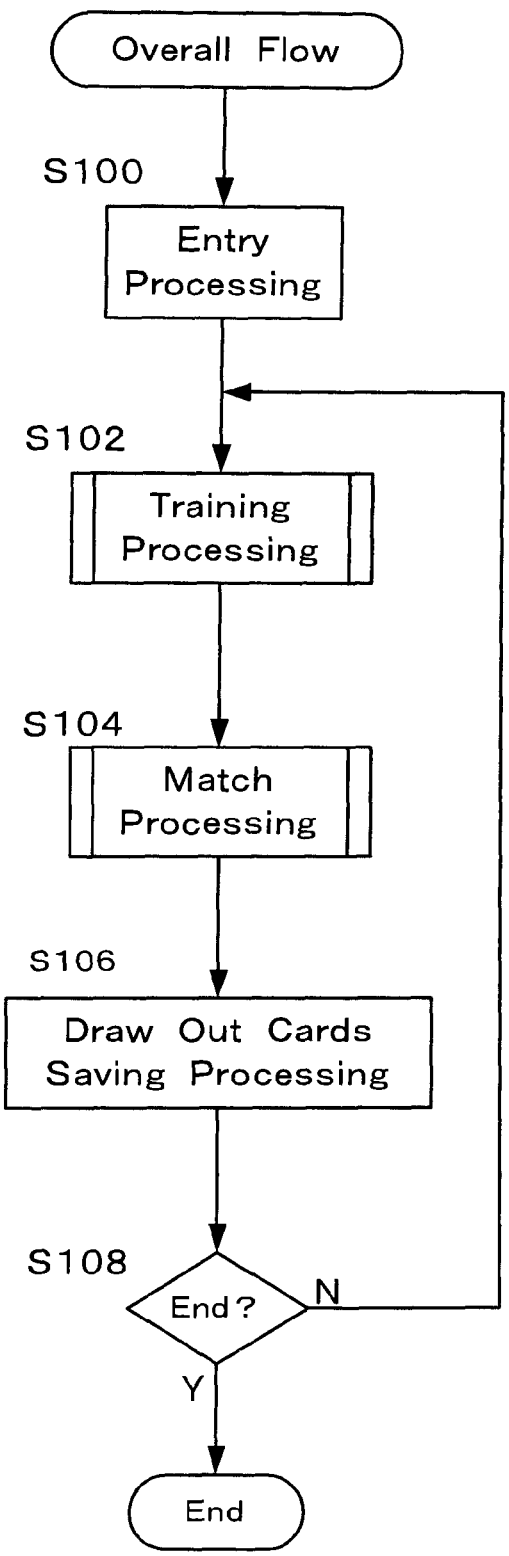
FIG. 7 is a flowchart showing an overall flow of a professional wrestling game according to the present professional wrestling game.

An outline of a flow from start to end of the present professional wrestling game will be described with reference to the flowchart shown in FIG. 7. First of all, a player who plays this card game for the first time buys a starter pack at a card vending machine. The starter pack includes one entry card 10, one wrestler card 11, and ten technique cards 12 . . . 12. By using the cards included in this starter pack, the player can participate in the present professional wrestling game. Therefore, the player starts a game with one wrestler at the outset. The player ID stored in the entry card 10 is the player ID of the player who bought the entry card 10.

In the present professional wrestling game, an entry processing is performed when the player makes a first entry to the game (step S100). When the player inserts the entry card 10 into a card insertion port of the game machine CL and then enters a coin, a processing for registering a professional wrestling group to participate in a match and wrestlers belonging to the group is first performed. Specifically, a group name input by the player is stored in the storage unit 3 in association with the player ID. If the player slashes the wrestler card 11 of the wrestler 13 as the wrestler to be registered in the group at the time of registration, the wrestler information 20 associated with the wrestler ID is invoked from the center server CS. In addition, the player ID is stored in the storage unit 3 in association with the invoked wrestler information 20 or the wrestler information stored in the storage unit 3 in advance. Data having the wrestler information 20 in association with the player ID will be referred to as "the wrestler information 21" hereinafter. A data structure of the wrestler information 21 is shown in FIG. 8A.

Next, when the player selects "training" on a menu screen, a training processing starts (step S102). In this training processing, the player registers the technique 14 as the technique which the wrestler 13 can use, and the experiential value can be increased for the technique 14 of the wrestler 13 as stated above. At the time of registering the technique which the wrestler 13 can use, if the player slashes the technique card 12 of the technique 14, the technique information 30 of the technique 14 is stored in the storage unit 3 while making the player ID recorded in the entry card 10 inserted into the machine CL associate with the technique information 30 invoked from the center server CS using the technique ID of the technique 14 as a key or with the technique information 30 stored in the storage unit 3 in advance. The technique information 30 associated with the player ID will be referred to as "technique information 31" hereinafter. A data structure of the technique information 31 is shown in FIG. 8B. Details of the training processing will be described later.

After the end of the training, if the player selects "match" on the menu screen, a match processing as a battle game starts (step S104). During the match, a timing for using a technique is indicated. If the technique 14 is designated at that timing, the wrestler 13 can use the technique 14 at the experiential value acquired after the training. The mach progresses while the wrestler 13 and an opponent alternately use their techniques. The match ends when the life point score HP of the opponent or the wrestler 13 is equal to zero, when the wrestler 13 or the opponent is pinned, or when time lapses predetermined time. It is noted, however, the player who could pump up the match is a winner of the match. Details of the match processing performed during the match will be described later. The action of trying to conquer three counts from the opponent is a fall in this embodiment.

After the end of the match, some cards are drawn out from a drawing portion of the game machine CL, and the wrestler information 21 and the technique information 31 stored in the storage unit 3 are transmitted, together with the group name and the like associated with the program ID, to the center server CS and stored therein (step S106). In drawing of the card, the cards to be drawn out from the game machine CL are randomly selected by the game machine CL from the wrestler cards 11 or the technique cards 12. By drawing out the card, the player can increase the number of types of cards from the limited types of cards included in the starter pack.

Finally, in step S108, the player is indicated to decide whether to finish the present professional wrestling game. If the player decides to continue the game, the processing returns to the step S102. If the player decides to finish the game, the game ends. As already stated above, the wrestler information 21 and the technique information 31 are eventually stored in the center server CS and managed in the center server CS when they are not used in the present professional wrestling game. In a next game or later, if the entry card 10 is inserted into the card insertion port at the time of starting the present professional wrestling game, then the information associated to the player ID recorded in the inserted entry card 10, i.e., the wrestler information 21, the technique information 31, the group name, and the like are invoked from data stored in the center server CS, and stored in the storage unit 3 to be used as data for the present professional wrestling game.

Figure 9:
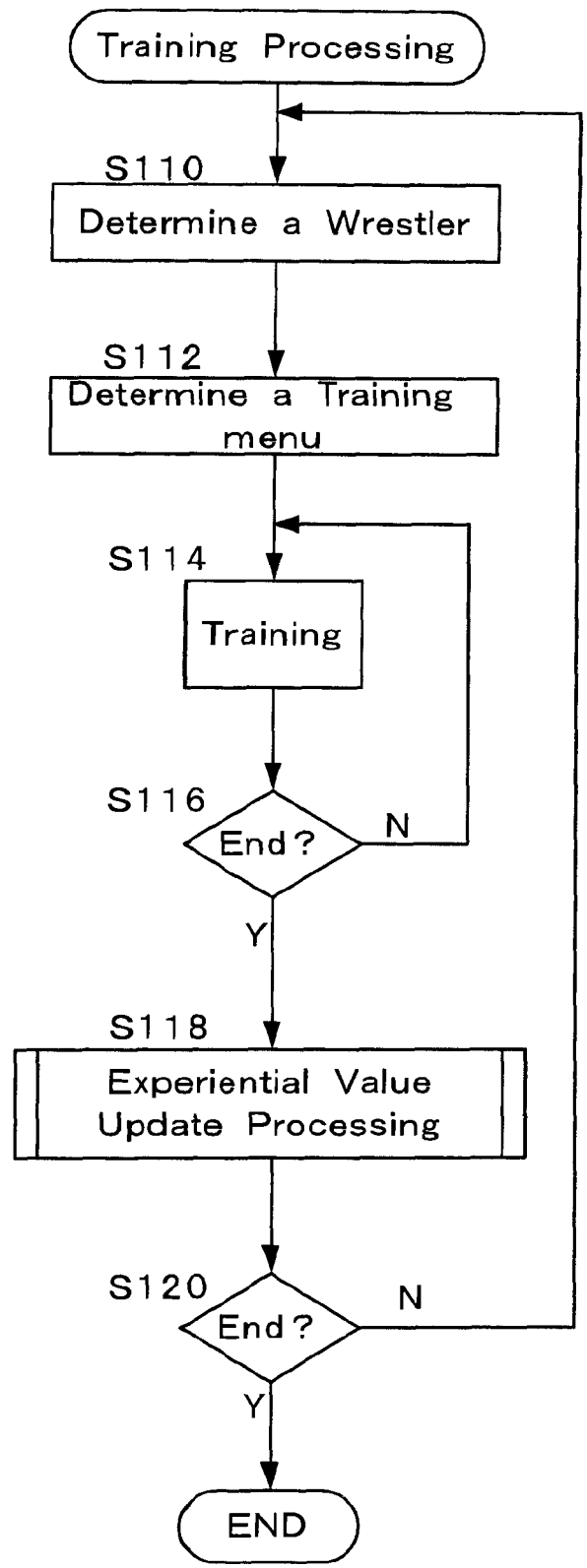
FIG. 9 is a flowchart showing a flow of processes in a training processing performed by a master machine.

The training processing will be described according to the flowchart shown in FIG. 9, giving an example that the wrestler 13 takes a training of the technique 14. The training processing is performed by the control unit 2 of the game machine CL. First, a wrestler selection screen for allowing the player to select the wrestler who takes the training is displayed on the output unit 5. If the player slashes the wrestler card 11 of the wrestler 13 at the input unit 4, it is determined that the wrestler who takes the training is the wrestler 13 (step S110). At this time, if the player slashes the wrestler card 11 of the wrestler whose wrestler information 21 is not stored in the storage unit 3, an error occurs. Next, a selection screen for allowing the player to select a training menu is displayed on the output unit 5. If the player slashes the technique card 12 of the technique 14, the training menu is determined as the technique 14 (step S112).

If the technique 14 is designated as the training menu for the wrestler 13 for the first time, the technique information 31 of the technique 14 is generated and stored in the storage unit 3 as already stated. At the steps S110 and S112, the wrestler ID of the wrestler 13 and the technique ID of the technique 14 are set as a training target wrestler and a training target technique, respectively. The training of the technique 14 is started (step S114) During the training, an image of, for example, the wrestler 13 who is training is displayed on the output unit 5.

It is determined whether one time training is finished (step S116). The training processing is continued until the training is finished. If it is determined that the training is finished, the training processing goes to an experiential value update processing (step S118). The experiential value update processing will be described later. Upon finishing the experiential value update processing, a screen for confirming whether the training processing is finished is displayed on the output unit 5, and it is determined whether to finish the training according to a player's indication (step S120). If the player indicates that the training processing is continued, then the processing returns to the step S110, and a processing for determining to select a next wrestler is started. If the player indicates that the training processing finishes, the training processing is finished.

Figure 10:
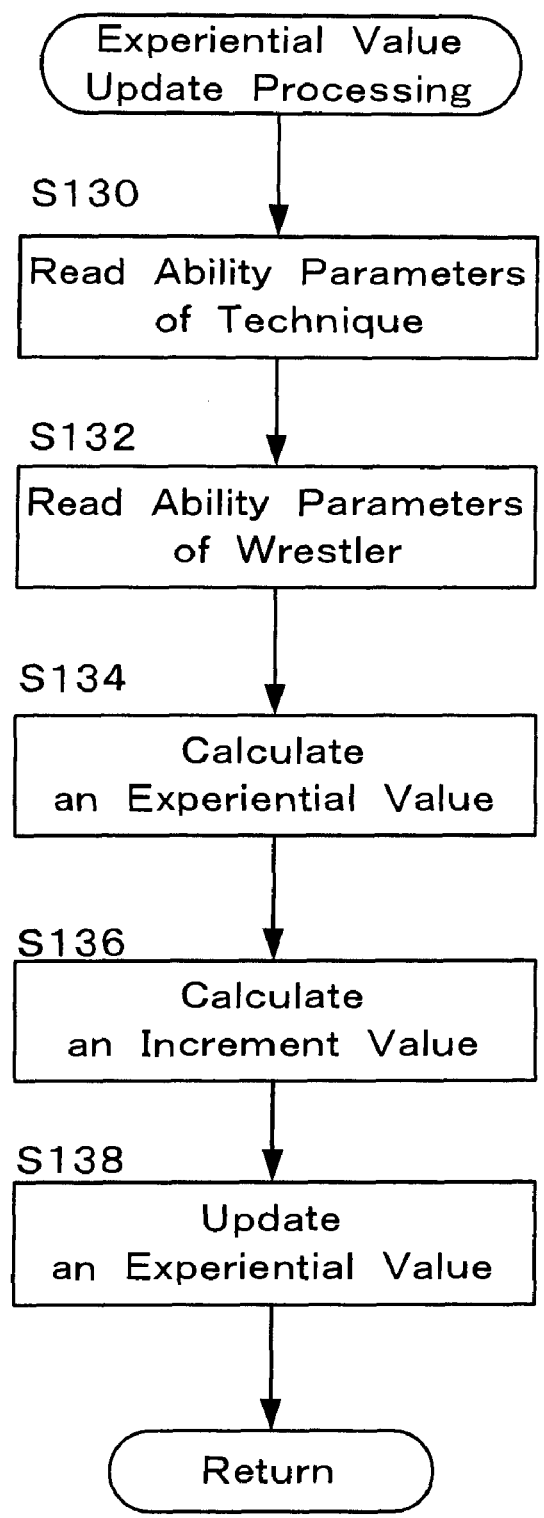
FIG. 10 is a flowchart showing a flow of processes in an experiential value update processing.

The experiential value update processing will be described with reference to the flowchart shown in FIG. 10. First, the difficulty-related parameters PWW, SPW, and TEW are read from the technique information 31 of the technique 14 stored in the storage unit 3 with the technique ID used as a key (step S130). Next, using the wrestler ID as a key, the offensive-ability-related parameters PWR, SPR, and TER are read from the wrestler information 21 stored in the storage unit 3 (step S132). In this embodiment, the parameters PWR, SPR, and TER are "power", "speed", and "technique", respectively. Hereinafter, if the ability parameters are referred to, it means parameters "power", "speed", and "technique" that are common to the wrestler information 21 of the wrestler 13 and the technique information 31 of the technique 14.

Based on the read ability parameters, the experiential value is calculated (step S134). In this embodiment, the experiential value is calculated based on a comparison of a sum of parameters related to abilities of the wrestler 13 relative to a sum of parameters related to abilities of technique 14. By thus comparing the sums, it is possible to generally evaluate the offensive abilities of the wrestler and judge the degree of learning of the wrestler 13 for the technique 14. Next, an increment value that is a degree of changing the experiential value by one time training is calculated (step S136). In this embodiment, the sum of the parameters related to abilities of the wrestler 13 (power=16, speed=10, and technique=10) is 16+10+10=36. The sum of the parameters related to abilities of the technique 14 (power=10, speed=20, and technique=10) is 10+20+10=40. Accordingly, the degree of damage when this wrestler 13 uses this technique 14 is 36/40=90 percent. The value obtained by dividing the damage of 90 percent into a certain division value is calculated as the experiential value obtained by one time training. The division value can be arbitrarily set. If the division value is 10, the experiential value obtained by one time training is 90/10=9 percent.

The value obtained by adding the increment value to the experiential value before the training (for example, if the experiential value before the training is 27 percent, the experiential value is increased by nine percent by one time training to 36 percent) is stored in the storage unit 3 in association with the player ID, the wrestler ID, and the technique ID as the experiential value after the training (step S138). If the experiential value is increased by nine percent by one time training, the wrestler 13 can perform 90 percent of the maximum degree of damage MD of the technique 14 by taking the training ten times. If the number of trainings exceeds ten, the abilities of the wrestler 14 are equal to or higher than the ability-related parameters stored in advance. Namely, if the wrestler 13 takes one more training after the ten trainings, the experiential value amounts to 90+9=99 by adding the increment value to the experiential value 90 percent before the training being 90. The maximum valued of the experiential value is 100 percent in this embodiment, and the value over 100 is omitted.

Figure 11:
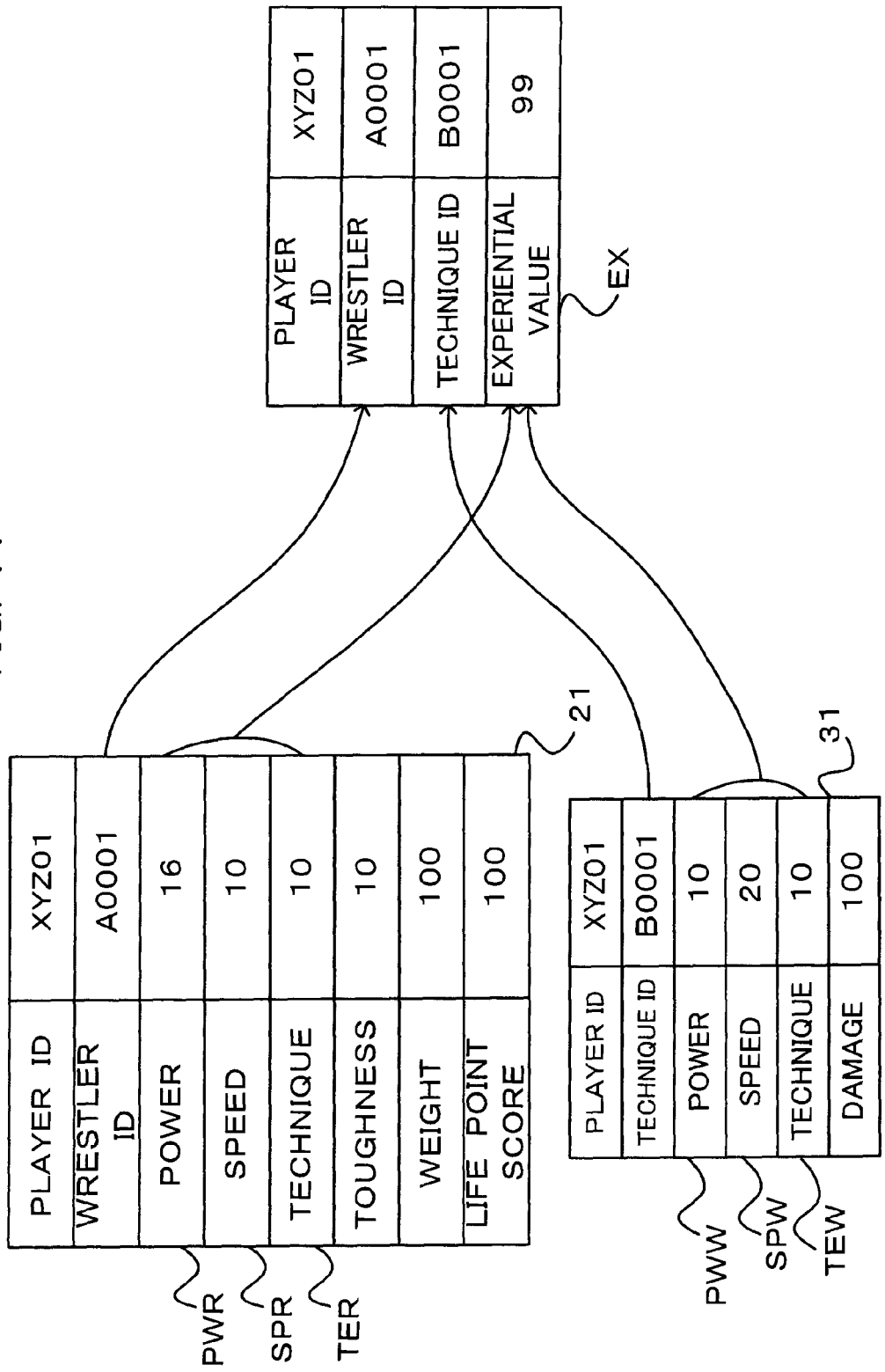
FIG. 11 shows a state in which an experiential value is generated according to this embodiment.

A data structure of the experiential value EX stored in the storage unit 3 by the experiential value update processing will be described with reference to FIG. 11. The experiential value EX when the wrestler 13 takes the training of the technique 14 will be described. As stated, the experiential value EX is associated with the player ID, the wrestler ID, and the technique ID. The player ID is a player ID recorded in the entry card 10 inserted into the card insertion port of the game machine CL. The wrestler ID is a wrestler ID associated with the wrestler information 21 of the wrestler 13 who takes the training. The technique ID is a technique ID associated with the technique information 31 of the technique 14 determined as the training menu. The experiential value EX is calculated by the above-stated method based on the ability-related parameters PWR, SPR, and TER in the wrestler information 21 of the wrestler 13 whom the player makes take the training, and the ability-related parameters PWW, SPW, and TEW in the technique information 31 of the technique 14.

The experiential value EX is finally managed by the center server similarly to the wrestler information 21 and the technique information 31, and invoked into the storage unit 3 with the player ID recorded in the entry card 10 inserted into the insertion port as a key when the present professional wrestling game starts next time.

The match processing will be described. The match processing is performed in the form of a battle between the game machines CL1 and CL2. The center server CS designates the game machines CL1 and CL2 that has applied for participation in the match as opponents. A series of operations of the center server CS may be performed by the conventional method. The game machines CL1 and CL2 designated as opponents mediate each other to determine which serves as a master machine and which serves as a terminal machine. To make this determination, a conventional method may be used. In this embodiment, an instance in which the game machine CL1 serves as a master machine M and the game machine CL2 serves as a terminal machine T will be described. When the master machine M and the terminal machine T are determined, then all of data including the wrestler information 21, the technique information 31, and the experiential value EX associated with the player ID of the player of the terminal machine T is transmitted from the storage unit 3 of the terminal machine T to the master machine M, and stored in the storage unit 3 of the master machine M.

Figure 12:
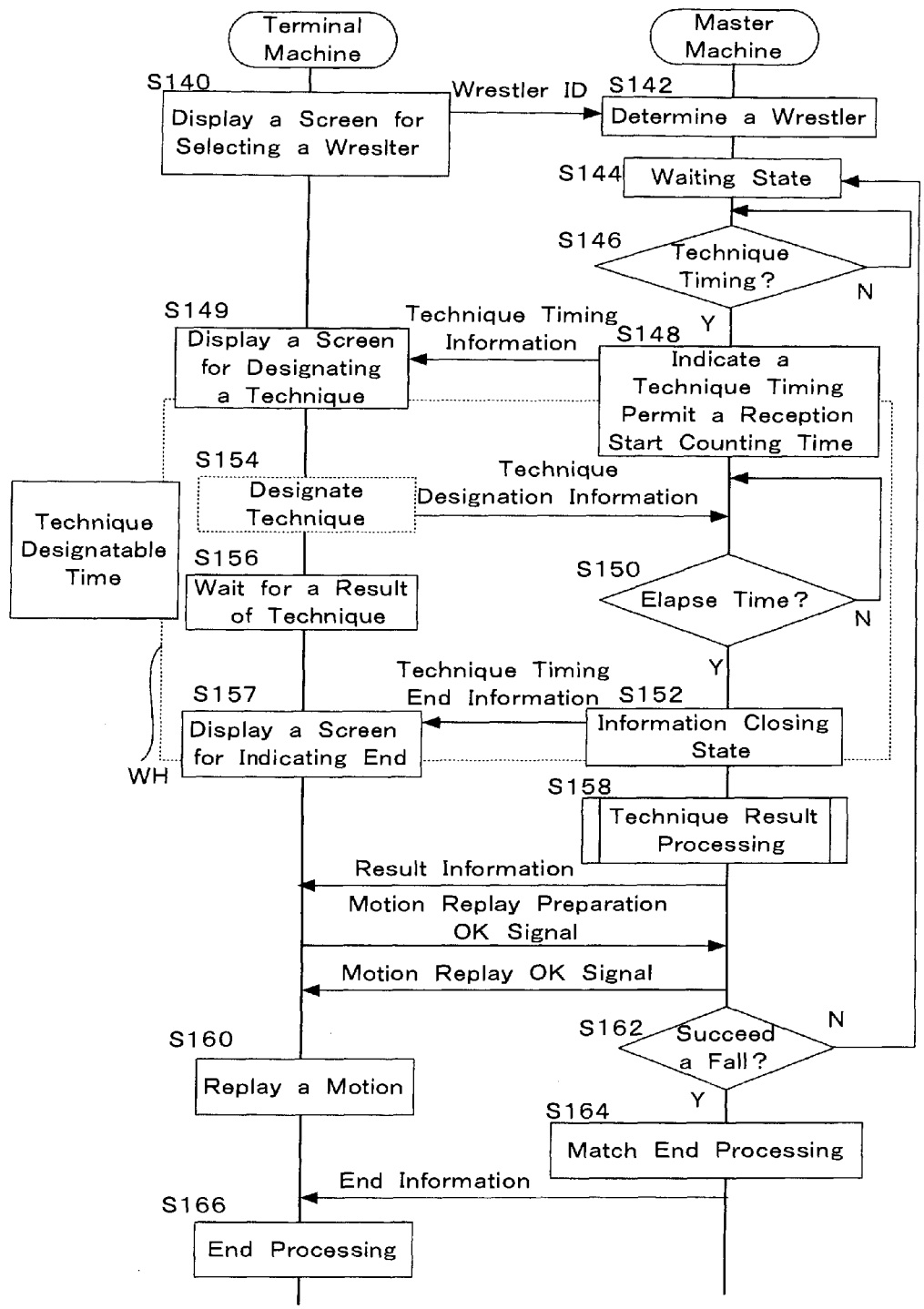
FIG. 12 is a sequence diagram showing a flow of processes in a match processing performed by the master machine and the terminal machine.

As the match processing, processes performed by the master machine M and the terminal machine T, respectively will be described with reference to the sequence diagram shown in FIG. 12. Although the master machine M also performs operations as the terminal machine T, the operations are the same as those performed by the terminal machine T which is not the master machine M. They will not be described herein. In addition, data transmission and reception between the master machine M and the terminal machine T is performed between the master transmission-reception unit 6a and the terminal transmission-reception unit 6b. Since this transmission-reception processing can be realized by a well-known method, it will not be described herein. Each process is performed by the control unit 2 of the master machine M and the control unit 2 of the terminal machine T.

First, the wrestler selection screen for allowing the player to select the wrestler who takes part in the match is displayed on the output unit 5 of the terminal machine T by an indication of the master machine M (step S140). When the player slashes the wrestler card 11 of a specific wrestler 13, the wrestler ID read from the wrestler card 11 is transmitted to the master machine M. Upon receiving this wrestler ID, the master machine M determines the wrestler 13 designated by the player as the wrestler who takes part in the match (step S142). When the wrestler 13 is determined as the wrestler who takes part in the match, then various parameters for the match used only in the match processing are initialized and associated with the player ID and the wrestler ID of the wrestler 13. The parameters for the match include, for example, a parameter "spirit" that shows a magnitude of a fighting spirit of the wrestler 13 during the match.

After the similar processing for determining the wrestler who takes part in the match about the opponent is completed, the match is started. When the match is started, the master machine M turns into a waiting state of waiting for information from the terminal machine T (step S144). This information waiting state is a state in which the master machine M waits for and receives player's various operations performed on the terminal machine T. Namely, the master machine M turns into a state in which the master transmission-reception unit 6a receives information about the player's operations transmitted from the terminal machine T. During this information waiting state, the master machine M determines whether a timing (hereinafter, called "technique timing") of allowing the player to use a technique comes (step S146). If determining that the timing comes, then the master machine M transmits technique timing information for indicating the player to designate the technique to the terminal machine T, permits the reception of the technique designation information transmitted from the terminal machine at the master transmission-reception unit 6a, and starts counting time preset as a technique designatable time for accepting the technique designation information (step S148). The technique designatable time WH is thereby started and the master machine M turns into a technique designation information waiting state. It is noted that the reception of the technique designation information transmitted from the terminal machine T is rejected at the master transmission-reception unit 6a of the master machine M until it is determined that the technique timing comes. The technique designation information will be described later.

After starting counting the time set as the technique designatable time WH, it is determined whether the time WH lapses (step S150). If the master machine M receives the technique designation information before it is determined that the time lapses, the master machine M turns into a state in which the master machine M rejects to receive further technique designation information from the terminal machine T that transmits the technique designation information. For instance, if the master transmission-reception unit 6a is prepared for each terminal machine T, the master machine M turns into a state to reject the reception of the technique designation information at the master transmission-reception unit 6a corresponding to the terminal machine T, which has transmitted the technique designation information once. If it is determined that the set time lapses, the master machine M turns into an information closing state, and transmits technique timing end information to the terminal machine T (step S152). The information closing state is a state in that any information about the player's operation including the technique designation information transmitted from the terminal is rejected at the master transmission-reception unit 6a. After turning into the information closing state, subsequently a technique result processing is executed in the master machine M (step S158). The technique result processing will be described later.

If the terminal machine T receives the technique timing information, a screen for indicating the player to designate a technique used by the wrestler 13 is displayed on the terminal machine T (step S149). The player can thereby recognize a state in that the designation of the technique is available. Accordingly, after the screen for requesting designation of the technique is displayed, the player should select a specific technique card 12 from the technique cards 12 . . . 12 owned by the player, and slashes the selected technique card 12 to designate the technique as the technique 14 to be used before the time set as the technique designatable time WH lapses.

If the player slashes the technique card 12, the technique ID of the technique 14 recorded in the technique card 12 is transmitted to the master machine M as the technique designation information (step S154). After transmitting the technique designation information, the terminal machine T turns into a state of waiting for a result of the technique 14 (step S156). Upon receiving the technique timing end information transmitted from the master machine M, a screen indicating end of the technique designatable time WH is displayed on the output unit 5 (step S157). As stated, after the terminal machine T transmits the technique designation information to the master machine M once, even if the terminal machine T further transmits technique designation information to the master machine M, the further technique designation information is rejected at the master transmission-reception unit 6a. Therefore, it is only one time within one technique designatable time WH that the player can designate the technique.

After end of the technique result processing, when result information of designated technique 14 is transmitted from the master machine M to the terminal machine T, the terminal machine T transmits a signal indicating that a motion replay preparation is completed. After receiving this signal, the master machine M transmits a signal indicating permission to replay a motion to the terminal machine T. Upon receiving this permission signal, the terminal machine T replays a scene in which the wrestler 13 uses the technique on the output unit 5 (step S160). The life point score HP displayed on the output unit 5 during this replay is set so that the life point score HP which is not updated is displayed before the wrestler 13 uses the technique and so that the updated life point score HP is displayed at the moment the wrestler 13 uses the technique. After transmitting the permission signal, in the master machine M it is determined whether a fall succeeds (step S162). If both players do not perform an operation for a fall or the fall fails, the processing returns to the step S146, at which the master machine M turns into the information waiting state. If the master machine M determines that the fall succeeds, the master machine M determines that the match is finished and performs a match end processing (step S164).

In the match end processing, it is determined who is eventually the winner of the match. In this embodiment, the party that pumps up the match more than the opponent wins as already stated. For example, a degree of excitement is prepared for every battling party as a parameter showing a degree of exciting the hall of the match. The degree of excitement is set so that the degree of excitement of the party which makes the hall more exciting increases more. After the end of the match, the winner is decided by comparing the degrees of excitement. To calculate the degree of excitement, a parameter related to pumping up the hall, e.g., a parameter that indicates a showiness of the technique or a popularity of the wrestler 13 as well as the above-stated parameters are prepared. Based on the prepared parameters, the degree of excitement can be calculated. The master machine M transmits winner-loser information to the terminal machine T as end information, and the terminal machine T displays an end screen based on the received end information to thereby finish the present professional wrestling game (step S166)

Figure 13:
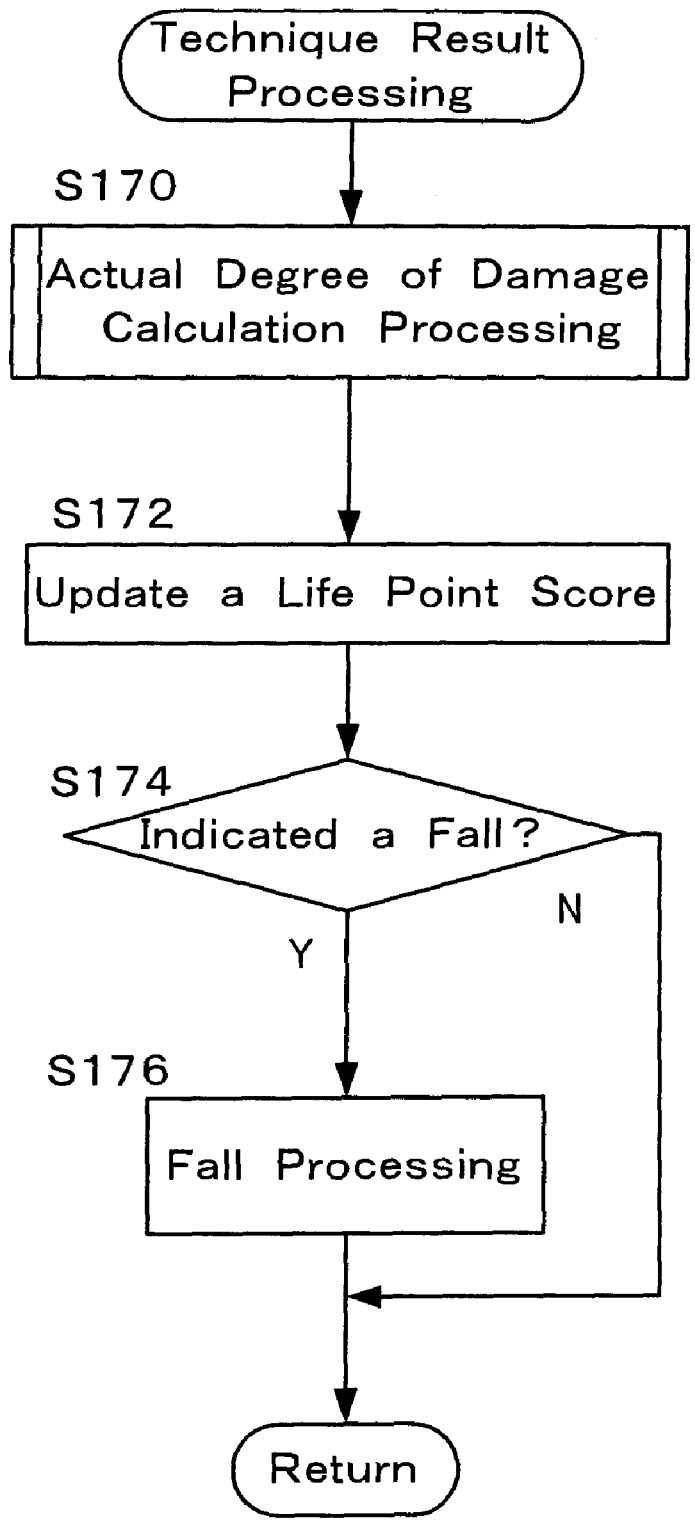
FIG. 13 is a flowchart showing a flow of processes in a technique result processing.

The technique result processing will be described with reference to the flowchart shown in FIG. 13. In this technique result processing, an actual degree of damage by which the wrestler 13 can do a final damage to the opponent is first calculated (step S170). In this embodiment, the degree of damage which the wrestler 13 can give the opponent finally is determined generally in view of a state in which the wrestler 13 uses the technique 14 and the parameters such as the toughness TH of the opponent. The degree of damage which the wrestler 13 can give to the opponent finally is referred to as "the actual degree of damage". An actual degree-of-damage calculation processing will be described later. Based on the calculated actual degree of damage, the life point score HP of the wrestler 13 is updated (step S172). Specifically, a value obtained by subtracting the actual degree of damage calculated in relation to the opponent from the life point score HP of the wrestler 13 is set as an updated HP of the wrestler 13.

Next, it is determined whether a fall has been indicated (step S174). Specifically, it is determined whether the fall button of the terminal machine T is being pushed during the information closing state of the master machine M. If it is determined that the fall button is being pushed, it is determined that a fall has been indicated and the processing goes to a fall processing (step S176). If it is determined that the fall button is not being pushed, the technique result processing is finished. In the fall processing, a random value is calculated, and it is determined that the fall succeeds when (the updated life point score HP of the wrestler who is given the fall)−(the random value) is less than zero, otherwise it is determined that the fall fails. For instance, a flag related to a fall is prepared. The flag is set to one if the fall succeeds and set to zero if the fall fails. It is thereby possible to determine whether the fall succeeds or fails depending on whether the flag is one or zero.

Figure 14:
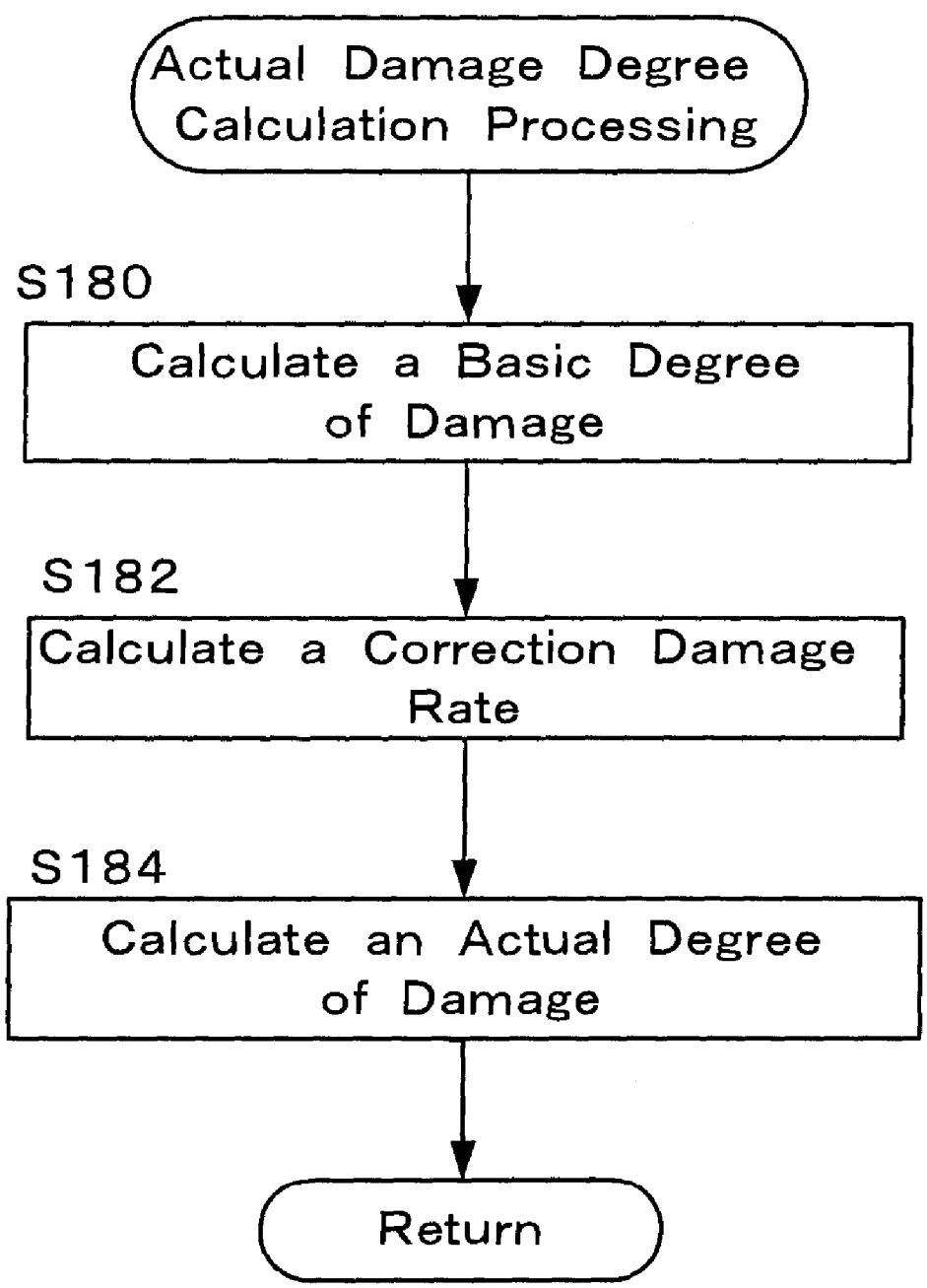
FIG. 14 is a flowchart showing a flow of processes in an actual damage degree calculation processing.

The actual degree-of-damage calculation processing will be described with reference to the flowchart shown in FIG. 14. First of all, a basic degree of damage is calculated (step S180). This basic degree of damage is calculated based on the maximum degree of damage MD of the technique 14 and the experiential value EX. The maximum degree of damage MD of the technique 14 is read from the technique information 31 stored in the storage unit 3 with the technique ID used as a key, and the experiential value EX in relation to the technique 14 of the wrestler 13 is read from the storage unit 3 with the player ID, the wrestler ID, and the technique ID used as a key. As stated, the maximum degree of damage of the technique 14 is 100 and the experiential value EX is 99, so that the basic degree of damage is 100×99 percent =99.

Next, a correction damage rate is calculated (step S182). Using this correction damage rate, the basic degree of damage can be corrected in view of a status in which the technique 14 is used. In this embodiment, the correction damage rate is calculated by using a status magnification and the experiential value EX. As the status magnification, a magnification according to the state in which the technique 14 is used is selected. For instance, the magnification in a rush state is 150 percent, the magnification in a state in which the opponent wrestler is "defensive" is 70 percent, the magnification in a state in which the opponent is "defensive" during the rush is 105 percent, and the magnification in the other states is 100 percent. The rush state is a state in which the technique 14 is designated when the spirit of the wrestler 13 is maximum, and the "defensive" state is a state in which not the technique 14 but the defensive state is designated within the technique designatable time WH. This "defensive" state can be designated by pushing the defensive button 9d of the terminal machine T when the designation of the technique 14 is permitted.

The correction damage rate is calculated by (((status magnification)/2)×((experiential value)/300)+((status magnification)/2))). In this embodiment, the status magnification is 100 percent and the correction damage rate is 66.5 percent. Next, the actual degree of damage is calculated (step S184). The actual degree of damage is calculated based on the correction damage rate and the basic degree of damage thus calculated. In this embodiment, the actual degree of damage can be obtained by ((basic degree of damage)×(correction damage rate)/100×20)/(toughness of opponent)). The toughness of the opponent is obtained by reading the toughness TH in the wrestler information 21 of the opponent stored in the storage unit 3 with the wrestler ID and the player ID of the opponent used as a key. In this embodiment, if the toughness TH of the opponent is 33, the actual degree of damage is 99×66.5/100× 20/33=39.9. After calculating the actual degree of damage, the actual degree-of-damage calculation processing is finished.

The present invention is not limited to the above-stated embodiment but may be carried out in various manners. In the embodiment stated above, the technique 14 is designated by the training menu to be trained. Alternatively, the parameters PWR, SPW, and TER related to the offensive abilities of the wrestler 13 may be trained to increase the value of each parameter. For instance, if the speed SPR is trained to improve, the value of the speed SPR in the wrestler information 21 stored in the storage unit 3 may be updated to the value after the training.

In the technique information 30, a technique level determined by the magnitude of the maximum degree of damage MD and a technique cost may be additionally included, and values of the technique level and the technique cost may be changed during a match. For instance, the technique cost which can be used in one match is determined, and set so that if the higher technique level is used, the higher the degree of excitement will be but the higher the technique cost will be consumed. By so setting, the player is forced to carefully select the technique to be used, and a sense of tension in the match can be made high. In addition, a success rate may be considered when the actual degree of damage of the technique is calculated. The success rate means a rate at which the technique is succeeded against the opponent. If this success rate can be calculated based on the experiential value, a state closer to a state of an actual professional wrestling can be realized. In addition, in the technique result processing, if the master machine M does not receive the technique designation information within the technique designatable time WH, the master machine M may appropriately select a technique and the processing may be carried out assuming that the technique is designated.

Further, techniques which can be used and those which cannot be used may be set according to each wrestler. For instance, the wrestler information 20 is stored while including technique IDs of the techniques which can be used by the wrestler in the information 20, and it is determined whether the technique ID of the technique designated during the match is included in the wrestler information 21. In the above-stated embodiment, if the technique 14 is not registered in the training processing, the wrestler 13 cannot use the technique 14 during a match. Alternatively, techniques 14 which the wrestler 13 can use may be determined in advance. In this case, technique ID of the technique 14 which the wrestler 13 can use is registered in the wrestler information 20. At the time of registration of the wrestler in the entry processing, the technique information 30 associated with the technique ID registered in the wrestler information 20 as well as the wrestler information 20 is invoked into the storage unit 3 and set as the technique information 31.

In the embodiment, the card system 1 in which the game machines CL each of which can serve as the master machine M or the terminal machine T are used, and in which the master machine M and the terminal machine T are designated has been described. Alternatively, the card system may be configured so that one master machine M is provided independently and a plurality of terminal machines T are connected to the master machine M. If the processing are performed only within the game machine CL, the card game system 1 may be constituted only by the game machine CL.

In the above embodiment, the barcodes are printed on the back faces 11b, 12b of the cards 11, 12, respectively. Alternatively, the barcodes may be printed on the front face 11a, 12a of the respective cards 11, 12. The number of parameters related to the difficulty of the technique and those related to the offensive abilities of the wrestler used in the game may be either larger or smaller than that described in the embodiment. While the three types of cards are used in the above embodiment, the number of types of cards may be larger than three. An order of processing for the cards in the above embodiment can be changed as long as the present invention can be realized. Screens other than those displayed on the terminal machine T may be appropriately displayed.

The invention claimed is:

1. A card game system, comprising:
a plurality of game apparatuses, each of which functions as either a master apparatus configured to control a game or a terminal apparatus configured to perform a process in accordance with indications from the master apparatus, the plurality of game apparatus being connected to each other so as to transmit and receive data to and from each other, wherein:

when one of the plurality of game apparatuses is set as the master apparatus, the game apparatuses other than the game apparatus set as the master apparatus are set to the terminal apparatuses, and each of the plurality of game apparatuses, when receiving time information during an ongoing game, wherein the ongoing game is a simultaneous game, is allowed to read and transmit game information recorded in a card to the game apparatus set as the master apparatus, the game progresses using the read game information, the game apparatus set as the master apparatus has:

a master reception device configured to receive the game information transmitted from each of the plurality of game apparatus, a start determination device configured to determine whether to start a specific time during the ongoing game, a permission device configured to make the master reception device reject to receive the game information at the master reception device until the start determination device determines to start the specific time during the ongoing game, and configured to transmit the time information to the plurality of game apparatuses including the game apparatus set as the master apparatus and permit the master reception device to receive the game information when the start determination device determines to start the specific time during the ongoing game, an elapse time determination device configured to determine whether a time set as the specific time in advance elapses after the permission device permits the reception of the game information, a rejection device configured to make the master reception device reject the reception again when the elapse time determination device determines that the set time elapses during the ongoing game, and a device configured to execute game progress processes using the game information received during the specific time during the ongoing game from the game apparatuses including the game apparatus set as the master apparatus, so that the game information from each of the game apparatuses affects a result of the ongoing game for each of the game apparatuses, and each of the plurality of game apparatuses has:

a device configured to, when receiving the timing information, make a player use a card to obtain the game information from the card, and a terminal transmission device configured to transmit the game information having been read to the master reception device.

2. The card game system according to claim 1, wherein the rejection device rejects the reception of the game information further transmitted from the game apparatus that is a sender of the game information already received by the master reception device even before the elapse time determination device determines that the set time elapses.

3. The card game system according to claim 1, wherein the number of the plurality of game apparatuses is two.

4. A card used in the card game system according to claim 1, wherein the card has three or more sides, and the game information is printed on a same face along the respective sides.

5. The card game system according to claim 1, wherein the ongoing game is a multiplayer game.

6. The card game system according to claim 1, wherein the ongoing game is a battle game.

7. The card game system according to claim 1, wherein the game information describes technique information that is used as attack content during the game progress processes.

* * * * *